US012568956B2

(12) United States Patent
Loomans

(10) Patent No.: US 12,568,956 B2
(45) Date of Patent: Mar. 10, 2026

(54) BIRD GUARD ASSEMBLY AND METHODS FOR INSTALLING SUCH AN ASSEMBLY ON A ROOF FOR PREVENTING BIRD NESTING UNDERNEATH A SOLAR PANEL

(71) Applicant: EBS European Building Supply B.V., Enkhuizen (NL)

(72) Inventor: Kevin Fabian Loomans, Zwaag (NL)

(73) Assignee: EBS European Building Supply B.V., Zwaag (NL)

( * ) Notice: Subject to any disclaimer, the term of this patent is extended or adjusted under 35 U.S.C. 154(b) by 516 days.

(21) Appl. No.: 18/160,510

(22) Filed: Jan. 27, 2023

(65) Prior Publication Data

US 2024/0032526 A1 Feb. 1, 2024

Related U.S. Application Data

(63) Continuation of application No. PCT/NL2021/050447, filed on Jul. 16, 2021.

(30) Foreign Application Priority Data

Jul. 27, 2020 (NL) ...................................... 2026147

(51) Int. Cl.
*A01M 29/32* (2011.01)
*E04D 13/00* (2006.01)

(52) U.S. Cl.
CPC .................................. *A01M 29/32* (2013.01)

(58) Field of Classification Search
CPC ..... A01M 29/30; A01M 29/32; E04D 13/004; E04D 13/064; E04D 13/076; E04D 13/178; H02S 20/23

USPC ................................................ 52/12, 95, 101
See application file for complete search history.

(56) References Cited

U.S. PATENT DOCUMENTS

| | | | | |
|---|---|---|---|---|
| 2,032,967 A | * | 3/1936 | Zorn ........................ | E04D 13/15 |
| | | | | 52/95 |
| 3,333,803 A | * | 8/1967 | Landis ................... | E04D 13/072 |
| | | | | 52/95 |
| 5,039,250 A | * | 8/1991 | Janz .......................... | E01F 7/02 |
| | | | | 405/15 |
| 5,299,528 A | * | 4/1994 | Blankenship .......... | A01K 31/12 |
| | | | | 119/537 |
| 5,303,523 A | * | 4/1994 | Hand ................... | A01K 5/0142 |
| | | | | 52/62 |
| 5,918,427 A | * | 7/1999 | VanderWerf .............. | E04B 1/72 |
| | | | | 52/517 |

(Continued)

FOREIGN PATENT DOCUMENTS

| | | | | |
|---|---|---|---|---|
| AU | 2008101266 A4 | * | 4/2009 | .......... E04D 13/004 |
| CH | 685528 A5 | * | 8/1995 | ............ A01M 29/32 |

(Continued)

*Primary Examiner* — Ryan D Kwiecinski
(74) *Attorney, Agent, or Firm* — Peacock Law P.C.; Justin R. Muehlmeyer; Daniel J. Berenger-Russell

(57) ABSTRACT

A bird guard assembly and methods for installing on a roof for preventing bird nesting underneath a solar panel. The assembly includes a bird guard with a rail arranged for abutting at least a part of a frame edge of the solar panel and a bird barrier for extending to the roof and a fastener comprising an arm and an arm sleeve arranged for only cooperating with the arm in a fastening direction for fastening the rail to the frame edge.

26 Claims, 13 Drawing Sheets

(56) References Cited

U.S. PATENT DOCUMENTS

| | | | | |
|---|---|---|---|---|
| 6,134,843 | A * | 10/2000 | Tregear | E04D 13/076 52/12 |
| D451,204 | S * | 11/2001 | Schlichting | D25/38.1 |
| 6,493,994 | B1 * | 12/2002 | Lucas | E04D 13/076 52/12 |
| 6,928,768 | B1 * | 8/2005 | Snow | A01M 29/26 256/10 |
| 7,020,995 | B1 * | 4/2006 | Snow | A01M 29/26 52/101 |
| 7,137,224 | B2 * | 11/2006 | Rasmussen | E04D 13/152 52/95 |
| 7,530,200 | B2 * | 5/2009 | Gramling | E04D 13/0727 52/12 |
| 7,581,359 | B2 * | 9/2009 | Bukeavich | E04D 13/004 52/16 |
| 8,161,692 | B2 * | 4/2012 | Lin | E04D 13/178 52/84 |
| 8,590,211 | B1 * | 11/2013 | Adams | E04D 13/076 52/12 |
| 9,394,683 | B1 * | 7/2016 | Hammons | A01M 29/32 |
| 10,480,193 | B2 * | 11/2019 | Brochu | B21D 28/26 |
| 11,191,261 | B1 * | 12/2021 | Yates | A01M 29/32 |
| 11,613,893 | B1 * | 3/2023 | Simpson | A01M 29/30 52/101 |
| 11,622,554 | B2 * | 4/2023 | Septien Prieto | A01K 45/00 52/101 |
| 2002/0050104 | A1 * | 5/2002 | Reeves | E04D 13/178 52/287.1 |
| 2003/0005649 | A1 * | 1/2003 | Austin | E04D 13/178 52/95 |
| 2003/0177717 | A1 * | 9/2003 | Gatherum | E04B 1/70 52/101 |
| 2004/0003547 | A1 * | 1/2004 | Beedle | E04D 1/365 52/101 |
| 2005/0161074 | A1 * | 7/2005 | Garvison | H02S 40/44 136/246 |
| 2008/0047206 | A1 * | 2/2008 | Gramling | E04D 13/0725 52/12 |
| 2008/0110106 | A1 * | 5/2008 | Holly | E04D 13/004 52/101 |
| 2010/0200713 | A1 * | 8/2010 | Miller | F21S 4/20 248/220.21 |
| 2010/0313491 | A1 * | 12/2010 | Austin | E04D 13/178 52/302.1 |
| 2011/0209419 | A1 * | 9/2011 | Lippie | A01M 29/32 52/101 |
| 2011/0214386 | A1 * | 9/2011 | Austin | E04D 13/004 52/745.06 |
| 2012/0066984 | A1 * | 3/2012 | Thompson | E04D 1/20 52/302.1 |
| 2012/0227352 | A1 * | 9/2012 | Austin | E04D 13/004 52/741.4 |
| 2012/0304559 | A1 * | 12/2012 | Ishida | H10F 19/31 52/173.3 |
| 2013/0161457 | A1 * | 6/2013 | Klinga | H02S 20/30 403/109.1 |
| 2014/0026946 | A1 | 1/2014 | West et al. | |
| 2014/0041318 | A1 * | 2/2014 | Donoho | B29C 45/00 52/101 |
| 2014/0150374 | A1 * | 6/2014 | Donoho | E04D 13/004 52/741.1 |
| 2014/0202086 | A1 * | 7/2014 | Reese | E04D 13/076 52/12 |
| 2015/0351330 | A1 * | 12/2015 | Toye | A01M 29/34 24/713.6 |
| 2016/0037765 | A1 * | 2/2016 | Peters | A01M 29/26 256/10 |
| 2017/0138054 | A1 * | 5/2017 | Adams | E04D 13/064 |
| 2018/0216347 | A1 * | 8/2018 | Adams | E04D 13/158 |
| 2019/0119018 | A1 * | 4/2019 | Chmelar | B65D 63/1072 |
| 2019/0119911 | A1 * | 4/2019 | Madden | A01M 29/32 |
| 2019/0218783 | A1 * | 7/2019 | Gori | E04D 13/076 |
| 2019/0222169 | A1 * | 7/2019 | Yang | H02S 20/23 |
| 2021/0265939 | A1 * | 8/2021 | De Bie | E04D 11/007 |
| 2024/0032526 | A1 * | 2/2024 | Loomans | A01M 29/32 |
| 2025/0088135 | A1 * | 3/2025 | Yang | F24S 25/634 |

FOREIGN PATENT DOCUMENTS

| | | | | | |
|---|---|---|---|---|---|
| DE | 20303875 | U1 * | 7/2003 | | E04D 13/178 |
| DE | 202005014618 | U1 * | 12/2005 | | A01K 3/00 |
| DE | 202017005880 | U1 * | 11/2017 | | A01M 29/32 |
| DE | 202019000121 | U1 | 4/2019 | | |
| DE | 202024105662 | U1 * | 12/2024 | | F16B 5/065 |
| GB | 2221481 | A * | 2/1990 | | A01M 29/32 |
| GB | 2354266 | A * | 3/2001 | | E04D 13/0459 |
| GB | 2538222 | A * | 11/2016 | | H02S 20/23 |
| JP | S624117 | Y2 * | 1/1987 | | |
| JP | S6367127 | U * | 5/1988 | | |
| JP | 2020097835 | A | 6/2020 | | |
| WO | WO-9320690 | A1 * | 10/1993 | | A01M 29/12 |
| WO | WO-9405874 | A1 * | 3/1994 | | E04D 13/0725 |
| WO | WO-2005104837 | A1 * | 11/2005 | | E04D 13/004 |
| WO | WO-2014098621 | A1 * | 6/2014 | | A01G 13/20 |
| WO | WO-2016016858 | A1 * | 2/2016 | | A01M 29/32 |
| WO | WO-2022025760 | A1 * | 2/2022 | | A01M 29/32 |
| WO | WO-2024080877 | A1 * | 4/2024 | | F24S 40/10 |
| WO | WO-2024194496 | A1 * | 9/2024 | | E04D 13/004 |

* cited by examiner

BIRD GUARD ASSEMBLY AND METHODS FOR INSTALLING SUCH AN ASSEMBLY ON A ROOF FOR PREVENTING BIRD NESTING UNDERNEATH A SOLAR PANEL

CROSS-REFERENCE TO RELATED APPLICATIONS

This application is a continuation of International Patent. Application No. PCT/NL2021/050447, titled "A BIRD GUARD ASSEMBLY AND METHODS FOR INSTALL-ING SUCH AN ASSEMBLY ON A ROOF FOR PREVENT-ING BIRD NESTING UNDERNEATH A SOLAR PANEL", filed on Jul. 16, 2021, which claims priority to and the benefit of Netherlands Patent Application No. 2026147, titled "A BIRD GUARD ASSEMBLY AND METHODS FOR INSTALLING SUCH AN ASSEMBLY ON A ROOF FOR PREVENTING BIRD NESTING UNDERNEATH A SOLAR PANEL", filed on Jul. 27, 2020, and the specifica-tion and claims thereof are incorporated herein by reference.

BACKGROUND OF THE INVENTION

Field of the Invention

The present invention relates to solar panel installations.

BRIEF SUMMARY OF THE INVENTION

Presently, solar panels are installed on a roof in such a manner that the panels are spaced from the roof. This allows the panels to be ventilated which protects the panels against overheating. Birds may find the spaces underneath solar panels to be exceedingly comfortable nesting locations. This is often detrimental to the solar panels, due to the fact that nesting activity can inhibit ventilation. The bird nests, once made, are further difficult to remove due to being lodged far underneath the panels. Bird nests may also prevent water from being drained from underneath the solar panel. In shingle roofs this may cause water to leak between the shingles into the roof. Removal of such nests may in some cases not be an option due to ecological considerations. It is more in general preferable to not disturb nesting birds. To this end solar panels may be placed closer to a roof at the cost of a reduced longevity of the panels.

Accordingly, there is a demand for preventing birds from nesting underneath solar panels in the first place.

The present invention aims to resolve at least one of the problems mentioned herein above or at least aims to provide an alternative.

To this end, an embodiment of the present invention (that is referred to herein as the "first aspect of the invention") is directed to a bird guard assembly for installing on a roof for preventing bird nesting underneath a solar panel comprising a frame edge; a bird guard comprising a rail arranged for abutting at least a part of the frame edge and a bird barrier for extending to the roof; and at least one fastener compris-ing an arm and an arm sleeve arranged for only cooperating with the arm in a fastening direction for fastening the rail to the frame edge.

Optionally, the sleeve comprises a protrusion defining a sleeve clamp surface for engaging the frame edge at a proximal end to a solar collector surface of the panel. The arm comprises a first part arranged for cooperating with the sleeve for fastening, and a second part defining an arm clamp surface for engaging the rail.

In addition to the above the first part of the arm and the second part of the arm may be integral via a kink in the arm, wherein the first part and the second part each increase in thickness towards the kink. This increases the structural integrity of the arm, and beneficially allows the force for fastening the panel and bird guard to translate into a pulling force exerted over the arm.

It is noted that the protrusion may be kinked so as to form an upside-down L-shape. The L-shape allows clamping forces to be supported through the elastic deformation of the protrusion. In such a situation the clamp surface is defined on a distal end of the L-shape. To improve grip the clamp surface may be profiled, such as undulated, ribbed and/or stubbled. The clamp surface may even extend outward from the rest of the face of the sleeve, such as 0.5-2 mm. If the sleeve is tightened beyond that which is required, such as by a zealous mechanic, the sleeve does no damage to the panel of bird guard, but instead is allowed to deflect backwards. This prevents the sleeve from being tightened too strongly.

Another option may be considered in which the second part is angled 70-110 degrees with respect to the first part, preferably perpendicular to the first part. Further to the above, the arm may be mechanically deformable during fastening so as to obtain a better fit. In order to improve the grip strength by the fastener the second part may be designed so as to be angled 87-89 degrees with respect to the first part prior to assembly. This allows for an elastic deformation of the bend between the first and second parts to contribute to gripping strength of the fastener while in assembly.

Optionally, the frame edge comprises an upstanding wall and a flange. The flange is substantially perpendicular to the upstanding wall, wherein the rail extends over an outer surface of the flange. The arm comprises a hook arranged for simultaneously curving around the flange and the rail.

Optionally, the first part defines an abutment surface for abutting the upstanding wall. Further to the above the hook may be integral with the arm, such as an extension of the second part of the arm.

A further option may entail a tip of the hook being curved around the flange and the rail so as to abut an inner surface of the flange. This beneficially prevents the bird guard from shifting with respect to the solar panel during as well as after installation.

Optionally, the sleeve comprises a passageway for the passage of the arm therethrough and having a moveable protrusion within the passageway. The protrusion is biased from the inner surface of the passage way into the passage way, and wherein the arm comprises a pawl path, such as a series of ridges, wherein a unidirectional engagement of the pawl path with the moveable protrusion of the passage way restricts movement of the arm to one direction within the sleeve. The above-mentioned bias may be understood to be a type of spring resistance, in that the protrusion is com-pressible towards the inner surface of the passage way to which it is connected, more specifically with which it is integral. The mentioned pall path can be seen as a ratchet across at least a part, such as a part of the lower surface, of the first part of the arm, wherein the protrusion may be seen as a pawl.

Optionally, the bird barrier comprises a plurality of spaced rods. The arm of the at least one fastener is arranged for extending through a space in between subsequent rods of the plurality of spaced rods. A benefit is that no additional holes have to be present or furnished in the bird guard which could otherwise compromise its integrity.

Besides all the before mentioned options a more detailed look may be cast on the hook of the fastener. In one example the distal end of the hook may serve to funnel the flange and rail into the interior of the hook. To this end the distal end of the hook may be bent outwards with respect to the curve of the hook so that the distal end and the second part diverge towards the first part. Beneficially, this allows the flange and rail to become pressed together as they are secured within the curl of the hook. It may be particularly beneficial to design the hook so that the gape of the hook is defined by the distance between an apex of the bend of the distal end and the second part and wherein the gape is 0.5-3.0 mm. The gape here being the minimum distance between the distal end of the hook and the second part.

It is often times considered ugly to have parts that stick out from the assembly. The first part of the arm is usually shortened. More specifically the part of the arm that extends outward through the sleeve is removed with clippers. Handling clippers or any other extra tools on a roof is cumbersome. Accordingly, the first part of the arm of the fastener may comprise at least one recess defined as a slit or notch in a lateral side of the first part of the arm for allowing a user to manually break the first part of the arm there along. The at least one recess may comprise a plurality of recesses spaced from each other in the length direction of the first part of the arm. The lateral recess allows the part to be broken off by a sideways breaking motion. In this manner the fastener is prevented from breaking by any forces exerted on the fastener as a result of fastening.

In another embodiment of the invention, the assembly comprises a fastener according the at least one fastener as described above.

Another embodiment of the present invention is directed to a method for preventing bird nesting underneath solar panels, comprising the steps of: providing a solar panel comprising a frame edge; providing a bird guard comprising a rail for abutting at least a part of the frame edge and a bird barrier; providing at least one fastener comprises an arm and an arm sleeve arranged for only cooperating with the arm in a fastening direction and placing the rail on the frame edge; fastening the rail to the frame edge between the sleeve and a part of the arm by moving the sleeve over the arm in the fastening direction; and installing the solar panel on a roof of a building such that a bird barrier of the bird guard extends towards the roof.

Optionally, the frame edge comprises an upstanding wall and a flange, wherein the flange is substantially perpendicular to the upstanding wall. Other options according to the first aspect of the invention may also be incorporated. The method step of placing the rail on the frame edge would in this option further comprises extending the rail over an outer surface of the flange.

Further to the above the arm may for example also comprises a hook, and wherein the method step of fastening the rail to the frame edge comprises simultaneously hooking the arm around the flange and the rail using the hook before moving the sleeve over the arm in the fastening direction.

Optionally, the sleeve comprises a protrusion defining a sleeve clamp surface and wherein the arm comprises a first part arranged for cooperating with the sleeve for fastening, and a second part defining an arm clamp surface. The method step of fastening the rail to the frame edge in this option comprises engaging the frame edge, with the sleeve clamp surface, at a proximal end to a solar collector surface of the panel, and wherein the method step of fastening the rail to the frame edge further comprises engaging the rail with the arm clamp surface.

Another embodiment of the present invention is directed to a method for preventing bird nesting underneath solar panels, comprising the steps of: providing the assembly according to the first aspect of the invention; fastening the rail to the frame edge using the at least one fastener; and installing the assembly on a roof of a building such that a bird barrier of the bird guard extends towards the roof.

Another embodiment of the present invention is directed to an alternative embodiment of a fastener which does not rely on the fastening of a sleeve. However, this does serve to assemble a bird guard and a solar panel together. To this end the fastener comprises: an arm defining a first part and a second part, wherein the first part and second part are substantially perpendicular to each other; and a first leg extending outward from and substantially perpendicular to the first part of the arm, wherein the first leg and the second part are spaced apart, such as about 30-50 mm, so as to allow a portion of the solar panel and a portion of the bird guard to be clamped together therebetween. In effect the function of this embodiment is thus the same as that of the fastener as described in the first embodiment. The first leg serves to substitute the sleeve in assemblies wherein the exact dimensions of a solar panel and bird guard are known. This is thus only suitable for solar panels and bird guards of a predefined size. This trades universality for ease of use.

Optionally, the fastener comprises a second leg extending outward from and substantially perpendicular to the first part of the arm, wherein the first and second leg extend upwards from the same face of the arm and are spaced about 20-40 mm apart. This allows a user to hook his finger behind the second leg while fastening the solar panel and bird guard. It is otherwise very cumbersome to hold the fastener while creating an assembly of a solar panel, bird guard, and fastener.

It should be noted that much like the fastener according to other embodiments of the invention described above, the second part of the arm tails off into a hook. This hook is used to the same effect as the hook that is described in the first aspect of the invention. It is noted that all features carrying the same name work to the same effect as in the first aspect of the invention.

It is also possible for the fastener to have a first part of the arm provided with a recess. This recess would be located between the first leg and the second leg, preferably within about 0-2 mm from the base of the first leg. This allows the user to snap off the excess material without compromising the integrity of the fastener. This recess may be furnished as a slit in the lateral side of the first part. This prevents accidental breaking of the fastener during the step of fastening. It is noted that the first and second legs may be integral with the first part of the arm. This allows for the whole fastener to be injection or cast molded.

Lastly, a distal end of the first leg may define a lip extending forward from the leg in the clamping direction. This allows for an elastic deformation of the first leg to become focused into the lip, which acts as a clasping surface.

It is noted that any reference to the "first aspect" of the invention is not intended to suggest that such is a preferred embodiment of the invention. It is simply used for ease of reference and describing the various embodiment of the invention.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may

BRIEF DESCRIPTION OF THE SEVERAL
VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more embodiments of the invention and are not to be construed as limiting the invention. In the drawings.

Figure 1:
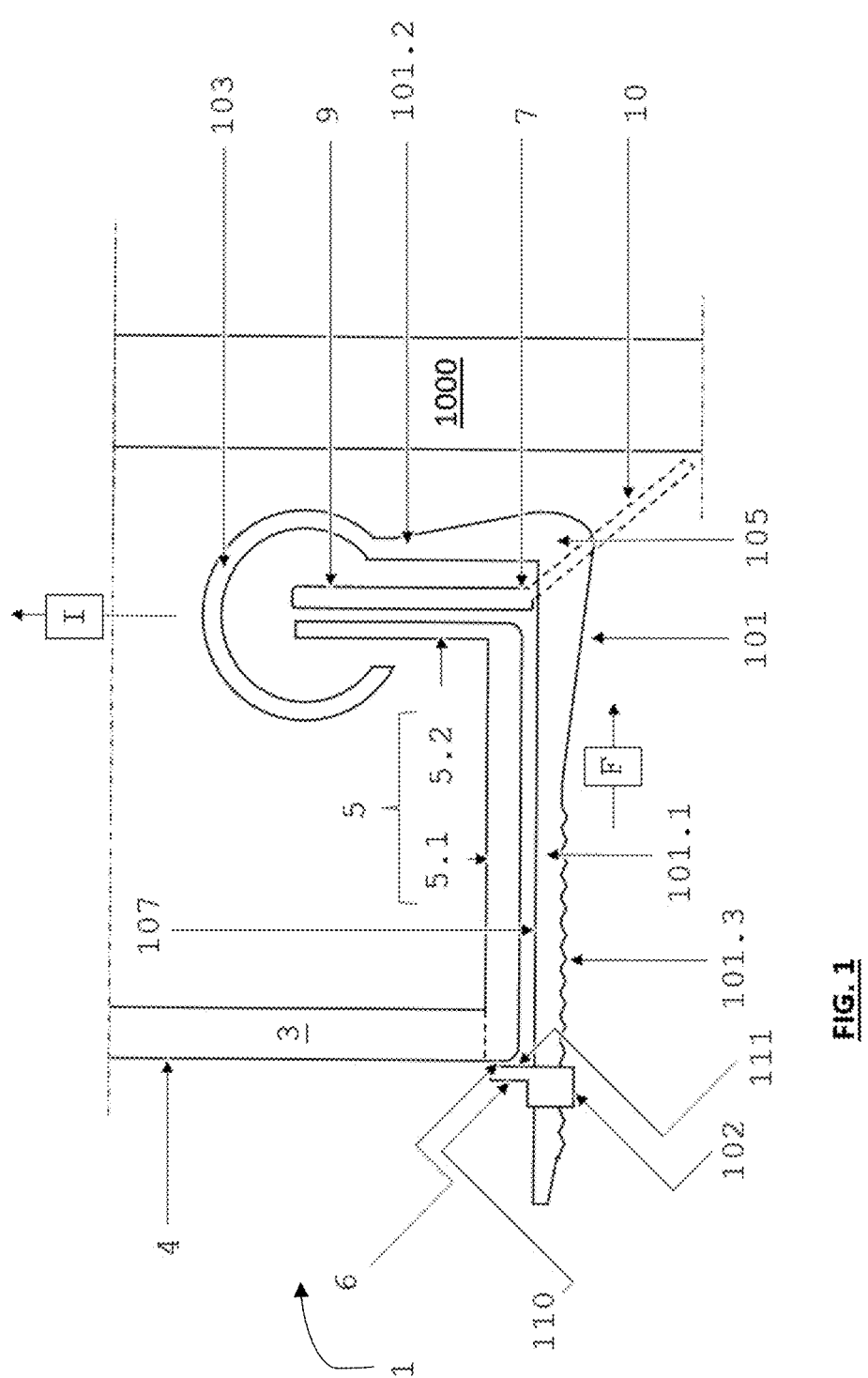
FIG. 1 is a schematic illustration showing a bird guard assembly on a roof according to an embodiment of the present invention.

DETAILED DESCRIPTION OF THE
INVENTION

Whenever in the figures the same reference numerals are applied, these numerals refer to the same parts.

FIG. 1 shows a schematic drawing of a bird guard assembly 1 according to the invention on a roof 1000 for preventing bird nesting underneath a solar panel. FIG. 1 shows the assembly has a solar panel 3 in a frame edge 5, such as an aluminium or steel frame edge. The solar panel is arranged to receive sunlight a solar collector surface 4 for its operations.

Figure 2:
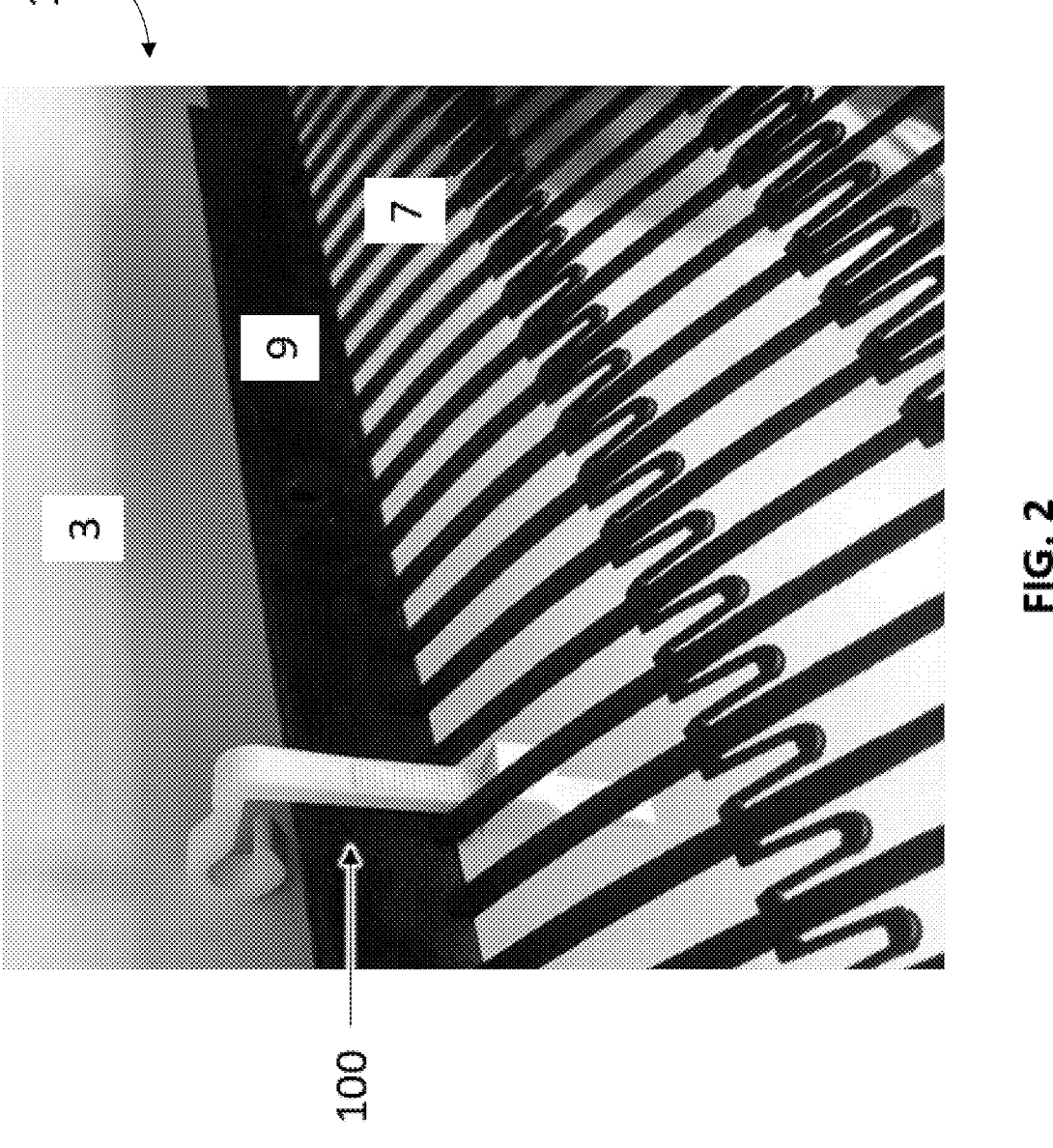
FIG. 2 is a grey scale illustration of an underside of a bird guard assembly, during an assembly step, according to an embodiment of the present invention.

The assembly 1 also has a bird guard 7 comprising a rail 9. FIG. 2 shows the bird guard to also comprise a bird barrier 10 which extends from the rail toward the roof. The assembly can further be seen to have at least one fastener 100, hereinafter the fastener, and although in all subsequent figures only one fastener will be shown, the person skilled in the art will understand that a plurality of fasteners can be used, such as for longer panels. The at least one fastener comprising at least two fasteners has also separate from the below examples the benefit of allowing for a backup so that the assembly does not disassemble upon the failure of a single fastener. In FIG. 1, the fastener can be seen to be in its final position. In FIG. 2 the fastener 100 is not yet fully fastened, nor in its final position. FIG. 2 shows a possible intermediate step in the process of fastening the bird guard to solar panel. In FIG. 1 the bird barrier can be seen to be a grid structure consisting of a plurality of curved rods which are connected in series. The rods being spaced apart along the length of the rail 9 in such a manner that birds cannot pass therebetween. In this example the rods are spaced apart between about 1-10 mm. However, the person skilled in the art will understand that other barriers are also possible, such as a netting like chicken wire. The rail is arranged for abutting at least a part of the frame edge 5. In this example the frame edge 5 has an upstanding wall 5.1 and a flange 5.2. The frame edge is basically kinked inward, that is to say inflected in an inward direction I forming the flange. This flange 5.2 is substantially perpendicular to the upstanding wall 5.1. The upstanding wall is itself perpendicular with respect to the solar collector surface 4. The rail 9 extends over an outer surface of the flange 5.2, that is to say covers the flange at least in part. The assembly also can be seen to have a fastener 100 that consist of two separate parts. In this example the fastener consists of an arm 101 and an arm sleeve 102 arranged for only cooperating with the arm 101 in a fastening direction F for fastening the rail 9 to the frame edge 5, more specifically to the flange 5.2 of the edge.

Figure 9:
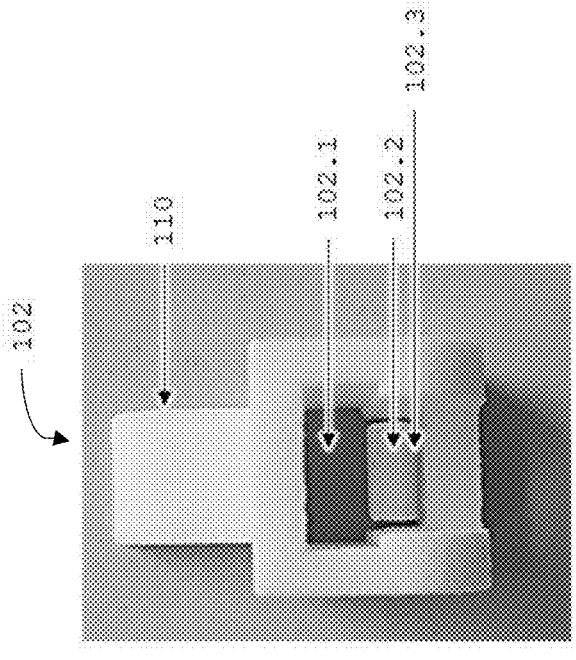
FIG. 9 is an illustration showing a rear view of the sleeve of the fastener according to an embodiment of the present invention.
Figure 8:
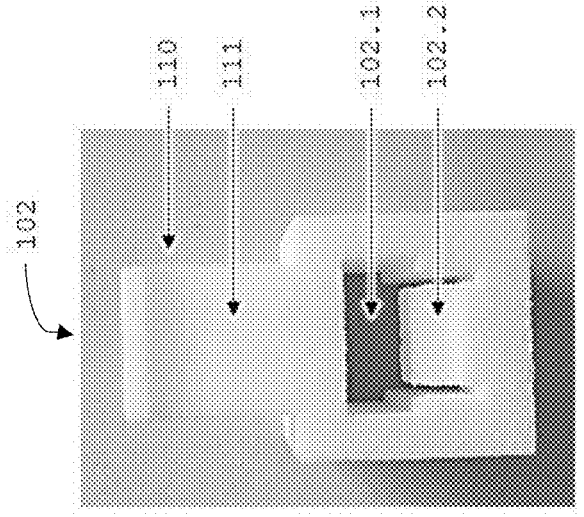
FIG. 8 is an illustration showing a front view of the sleeve of the fastener, according to an embodiment of the present invention.

The sleeve can also separate from this example be seen as comprising a passage way 102.1 for passage of the arm therethrough and having a moveable protrusion 102.2 within the passageway. FIG. 8 shows a front view of the sleeve 102, and FIG. 9 shows a rear view of the sleeve 102. The protrusion is biased up from the inner surface of the passage way into the passage way. The arm 101 is in this example provided with a pawl path 101.3, such as a series of ridges provided to a first part 101.1 of the arm 101. A unidirectional engagement of the pawl path 101.3 with the moveable protrusion of the passage way restricts movement of the arm 101 to one direction within the sleeve 102. From FIGS. 8 and 9 the protrusion can be seen to be ramp that is compressible toward an inner surface of the passage way to which the ramp is connected. The protrusion is integral with the sleeve. A rear facing part of the protrusion is shown in FIG. 9 and comprises a recess 101.3 for allowing compression to take place. The arm and sleeve are each of a plastic material, such as a polyethylene, polypropylene or any other suitable plastic material.

It is thus described that the arm 101 has a first part 101.1 arranged for cooperating with the sleeve 102 for fastening. The arm however also has a second part 101.2 defining an arm clamp surface for engaging the rail 9. Said first and second parts are integral. The sleeve 102 can further also be seen to have a protrusion 110 on an outer surface thereof defining a sleeve clamp surface 111 for engaging the frame edge 5 at a proximal end 6 to a solar collector surface 4 of the panel 3. The arm 101 can be seen to have a hook 103 which is integral therewith. This hook is arranged for simultaneously curving around the flange 5.2 and the rail 9. A tip of the hook 103, which is basically a distal end of the arm, is more specifically curved to around the flange 5.2 and the rail 9 so as to abut an inner surface of the flange 5.2. The hook may be considered to cradle the distal ends of both the rail and flange. This can be seen in FIG. 3.

It can also be seen that the first part 101.1 of the arm and the second part 101.2 of the arm are integral via a kink 105 in the arm. In fact, the hook 103 can be seen to be integral with the second part of the arm. The first part 101.1 and the second part 101.2 each increase in thickness towards the kink.

The second part 101.2 is substantially perpendicular to the first part 101.1. The fastener may however be provided such that prior to the fastening the rail 9 to the frame edge 5 the angle between the first part and second part is shallower such as about 70-90 degrees. This is to offset material flexing that may occur between the parts during the fastening of the rail 9 to the frame edge 5. FIG. 1 also shows that the first part 101.1 of the arm defines an abutment surface 107 for abutting the upstanding wall 5.1. That is to say, the first part 101.1 of the arm in an assembly will extend substantially parallel along an outer surface of the upstanding wall 5.1. It is pointed out that the abutment surface 107 can also separately from this example be defined on a side opposite to a side of the first part 101.1 of the arm on which the pawl path is provided 101.3.

Figure 4:
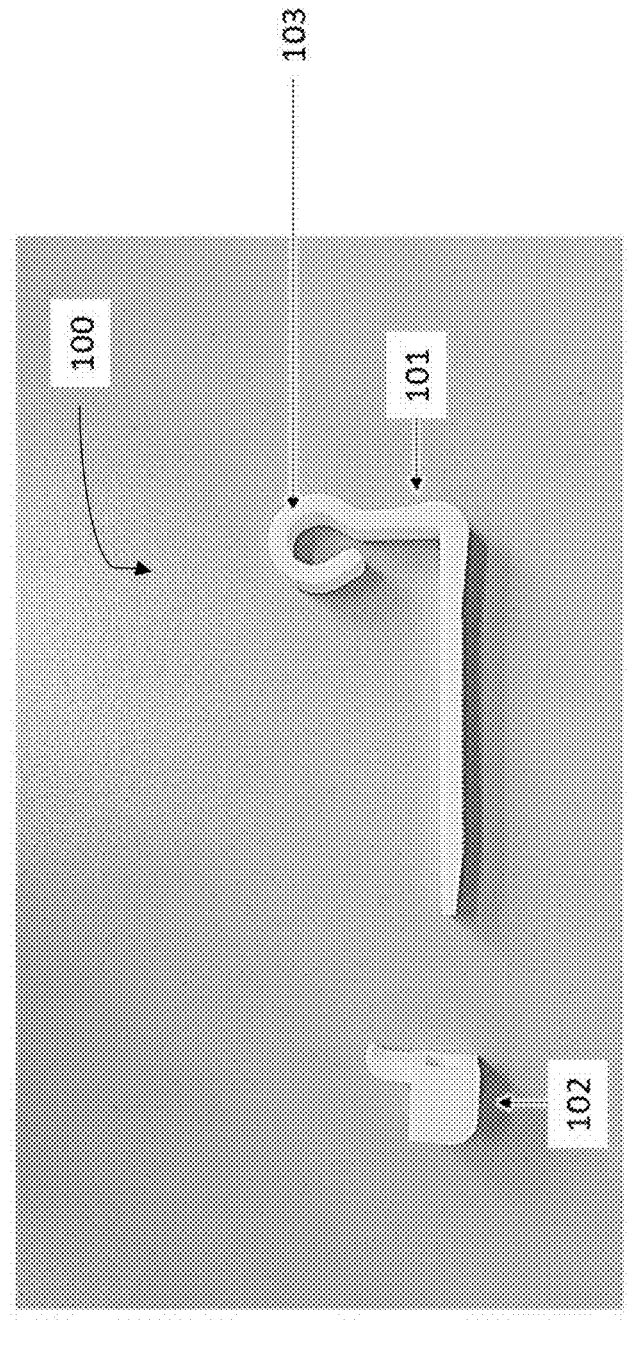
FIG. 4 is an illustration from a side view of the fastener, wherein a sleeve and an arm are unconnected, according to an embodiment of the present invention.

FIG. 4 shows the fastener 100 in which the arm 101 and the sleeve 102 are disconnected.

Figure 5:
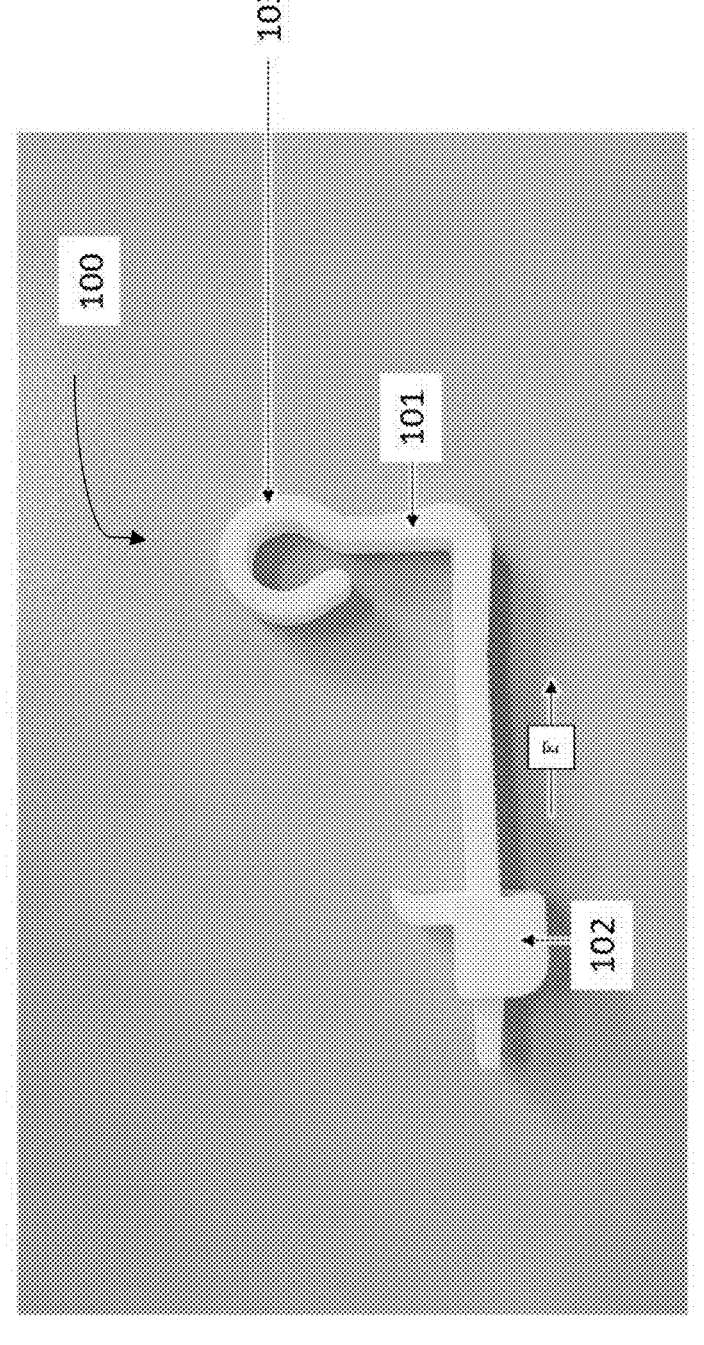
FIG. 5 is an illustration showing a side view of the fastener, wherein a sleeve and an arm are connected, according to an embodiment of the present invention.

FIG. 5 shows the fastener 100 in which the arm 101 and the sleeve 102 are connected, and in which the sleeve is moved up the first part of the arm in the fastening direction.

Figure 6:
FIG. 6 is an illustration showing another grey scale picture of an underside of a bird guard assembly, during an assembly step, according to an embodiment of the present invention.

FIG. 6 shows that the arm 101 of the fastener 100 is arranged for extending through a space in between subsequent rods 10.1, 10.2 of the plurality of spaced rods. In FIG. 6 the fastener is, much like in FIG. 2 not yet fully fastened nor in the final position for fully fastening the rail to the frame edge.

Figure 7:
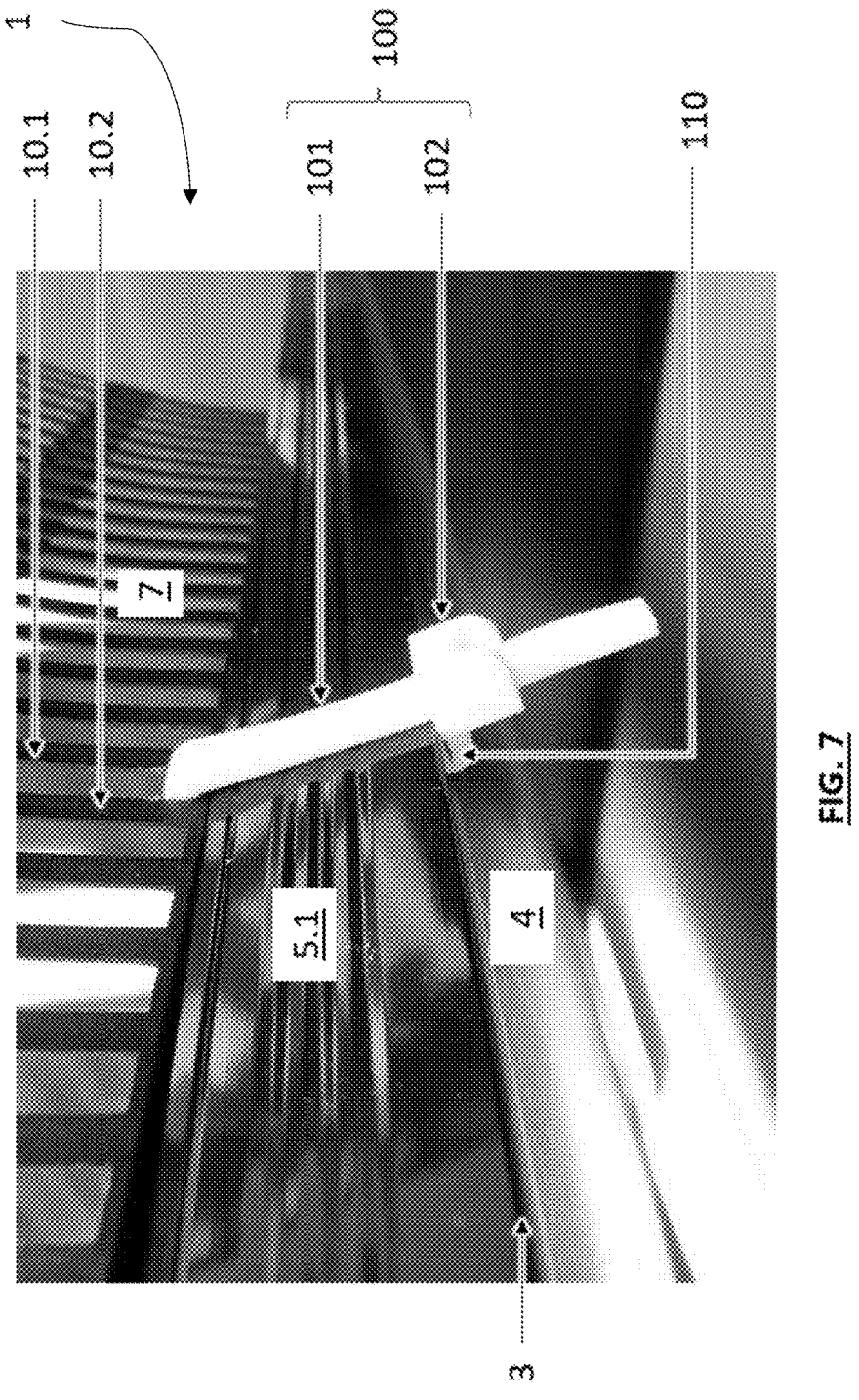
FIG. 7 is an illustration showing of an upside down sideview of a bird guard assembly, during an assembly step, according to an embodiment of the present invention.

In FIG. 7 the fastener is fully fastened and in a position such that the rail is fastened to the frame edge.

Figure 3:
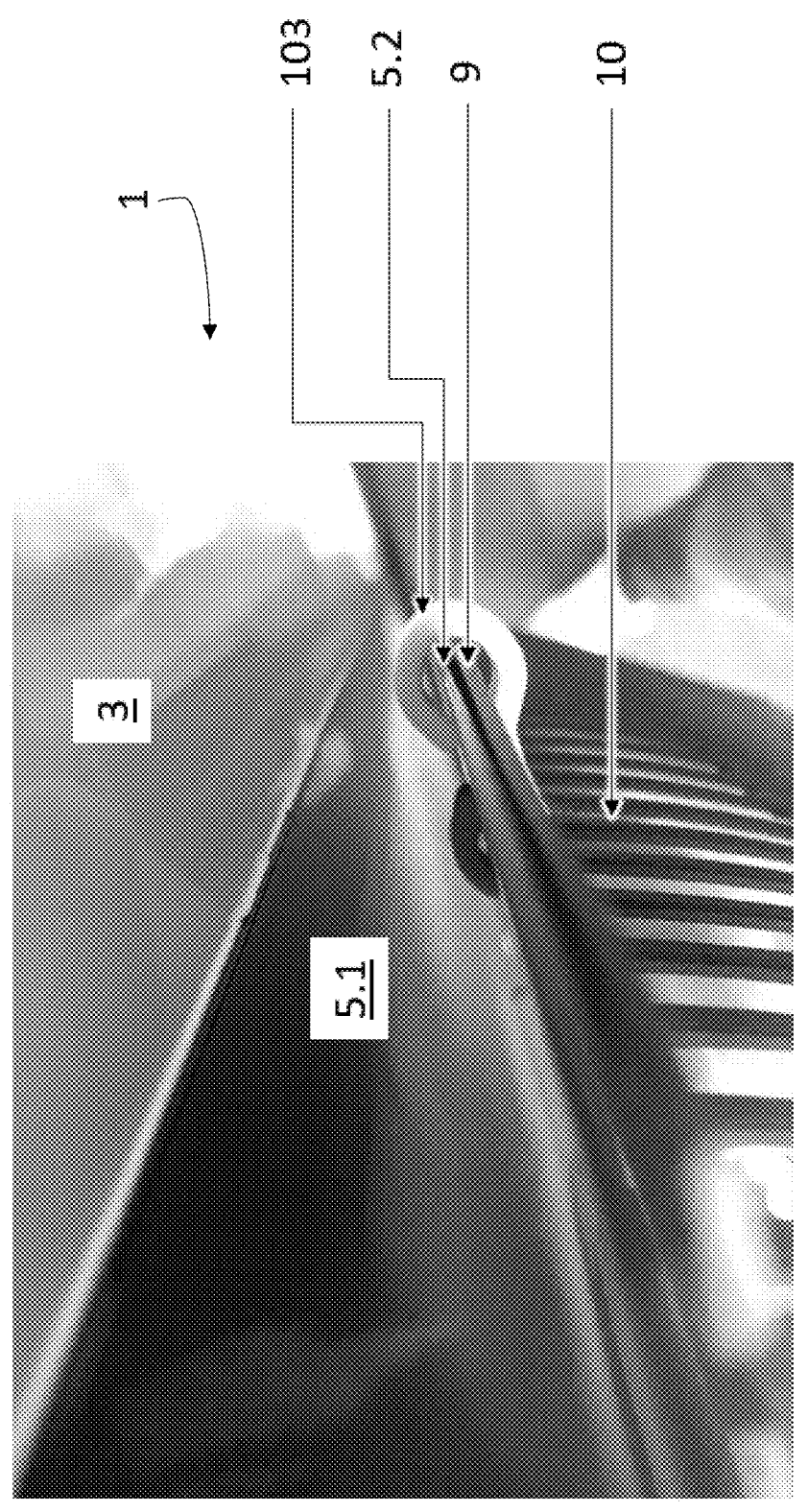
FIG. 3 is another grey scale illustration of an underside of a bird guard assembly, during an assembly step, according to an embodiment of the present invention.

A method of installation can be considered in which the above described solar panel, bird guard and fastener are provided. In this method a further method step entails placing the rail 9 on the frame edge 5 such as shown in FIG. 3. In a further method step the rail 9 is to be fastened to the frame edge 5 between the sleeve and a part of the arm by moving the sleeve over the arm in the fastening direction F. With the bird guard now fastened to the solar panel via said rail and frame edge an installation step may be performed in which the solar panel is installed on the roof 1000 of a building (not shown, but customary) so that a bird barrier 10 of the bird guard extends towards the roof 1000, and preferably meets with the rood such that birds are prevented access to the space between the panel and the roof. It should be understood that the method step of placing the rail on the frame edge comprises extending the rail 9 over an outer surface of the flange 5.2. The person skilled in the art will understand that the order of these method steps may be interchangeable. The method step of fastening the rail to the frame edge can further be considered to comprise simultaneously hooking the arm around the flange 5.2 and the rail 9 using the hook before moving the sleeve over the arm in the fastening direction F. The method step of fastening the rail 9 to the frame edge 5 also entails engaging the frame edge, with the sleeve clamp surface 111, at a proximal end 6 to a solar collector surface 4 of the panel 3. This can be seen in FIG. 7. The method step of fastening the rail 9 to the frame edge 5 further entails engaging the rail 9 with the arm clamp surface.

Figure 10:
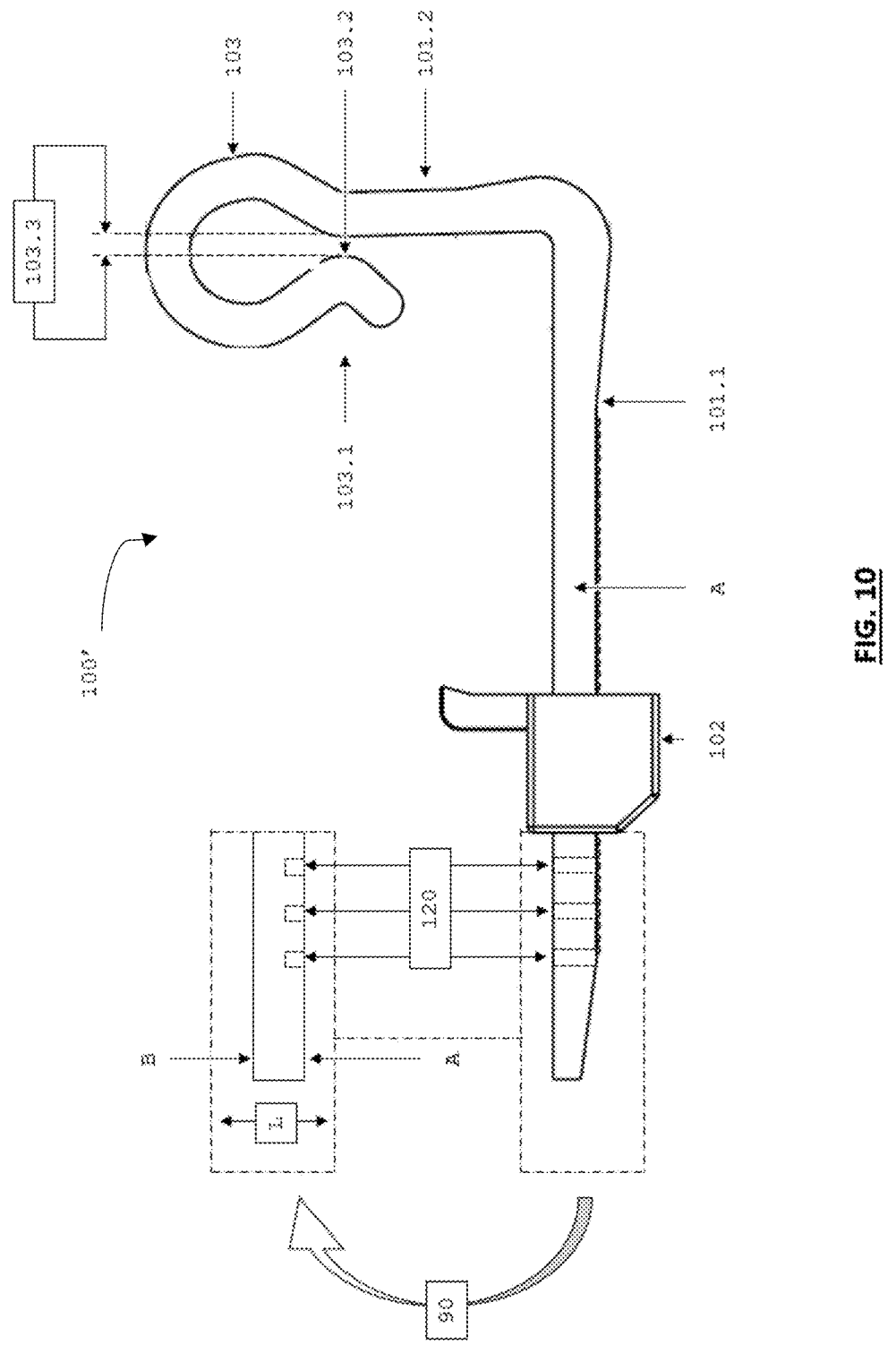
FIG. 10 is an illustration showing a schematic side view of an alternate fastener, wherein a sleeve and an arm are connected, according to an embodiment of the present invention.

FIG. 10 shows an alternative embodiment of the fastener 100' according to FIG. 5. This embodiment does not substantially differ from the fastener 100 as previously discussed. Rather certain added features can be identified. Accordingly, hereinafter only differences are discussed. Same features are provided with the same reference signs. In this example a distal end 103.1 of the hook 103 is bent outwards with respect to the curve of the hook itself so that the distal end and the second part diverge towards the first part 101.1. The hook is also designed such that the gape 103.3 of the hook is defined by the distance between an apex 103.2 of the bend of the distal end 103.1 and the second part 101.2. The gape 103.3 is 1.91 mm. It is also shown that, as a purely optional feature, the first part 101.1 of the arm of the fastener may be furnished with at least one recess 120. This at least one recess is preferably furnished somewhere in the latter half of first part 101.1 of the arm. In this example there are three recesses shown, but this may also be only one. In this example the recesses are each defined as a slit in a lateral side of the first part of the arm and serve for breaking the arm there along in a lateral direction L. Arrow 90 denotes that the highlighted section -.-.-.-.- is rotated 90 degrees with respect to the rest of the side view. The slits are all shown on a same lateral side. However, they may alternatively also be furnished to consecutively alternate between a first lateral side A of the first part of the arm and a second lateral side B of the first part of the arm.

Figure 11:
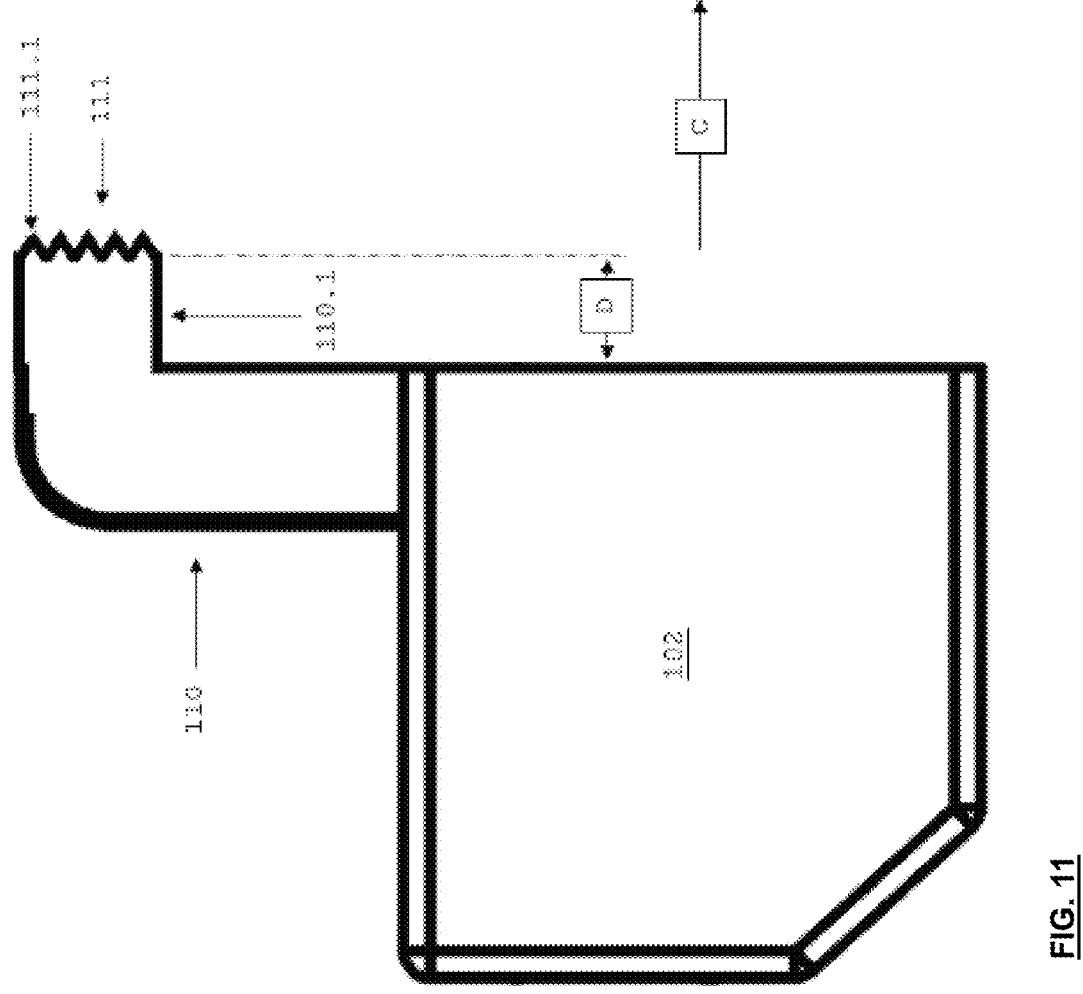
FIG. 11 is an illustration showing a schematic side view of an alternate sleeve according to an embodiment of the present invention.
Figure 12:
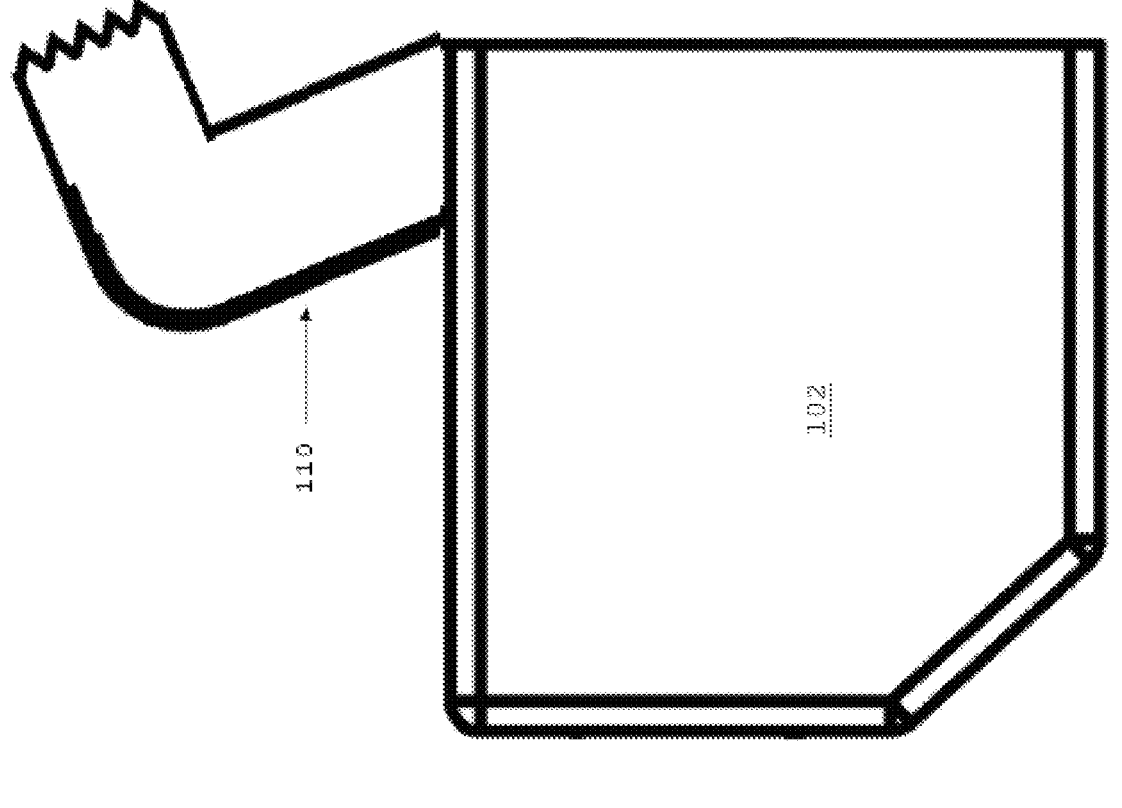
FIG. 12 is an illustration showing a schematic side view of an alternate sleeve being elastically deformed according to an embodiment of the present invention.

FIG. 11 shows schematic side view of an alternate sleeve 102' with respect to the sleeve 102 as discussed in FIG. 8. Hereinafter only differences will be discussed. Same features are provided with same reference numbers. In this example the protrusion 110 is kinked so as to form an upside down L-shape. The clamp surface 111 is here defined on a distal end of the foot of the L-shape 110.1 and is provided with ribs 111.1. The foot of the L-shape, also called the lip extends a predefined distance D forward, such as 1-2 mm, from the sleeve in the clamping direction C. FIG. 12 shows this same sleeve 102' wherein the L-shaped protrusion is elastically deformed during clamping.

Figure 13:
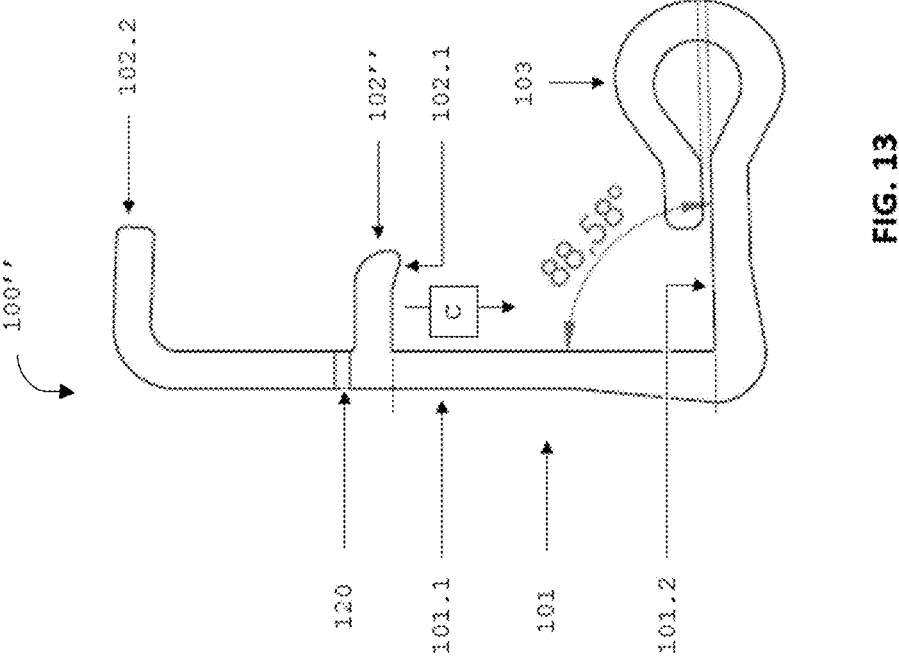
FIG. 13 is an illustration showing a schematic side view of a fastener, wherein the sleeve is replaced with a second leg, according to an embodiment of the present invention.
Figure 16:
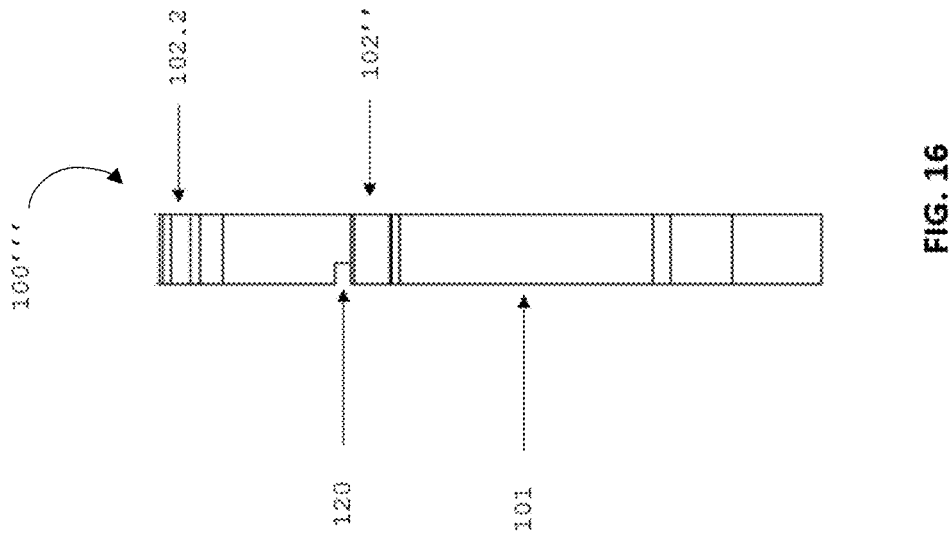
FIG. 16 is an illustration showing a schematic top-down view of the fastener according to FIG. 15.

FIG. 13 shows an alternative embodiment of the fastener 100" with respect to the fastener 100 according to FIG. 5. Hereinafter only differences are discussed. Same features are provided with same reference numbers. Here the fastener has first leg 102" that is integral with the first part of the arm 101.1 instead of a sleeve. There is also no track for a sleeve to move along. The first leg 102" extends outward from and substantially perpendicular to the first part of the arm 101.1. In practice a user will clamp a portion of the solar panel and a portion of the bird guard together between the first arm 102" and an inner surface of the second part 101.2 of the arm 101. A second leg 102.2 is also provided and extends outward from and substantially perpendicular to the first part of the arm 101.1. The first and second leg each extend upwards from the same face of the first part of the arm and are spaced 20-40 mm apart. The second part 101.2 of the arm further tails off into a hook 103. In this example at least one recess is furnished as a slit in the lateral side of the first part directly behind the base of the first leg 102″, such as within about 2 mm therefrom.

Figure 14:
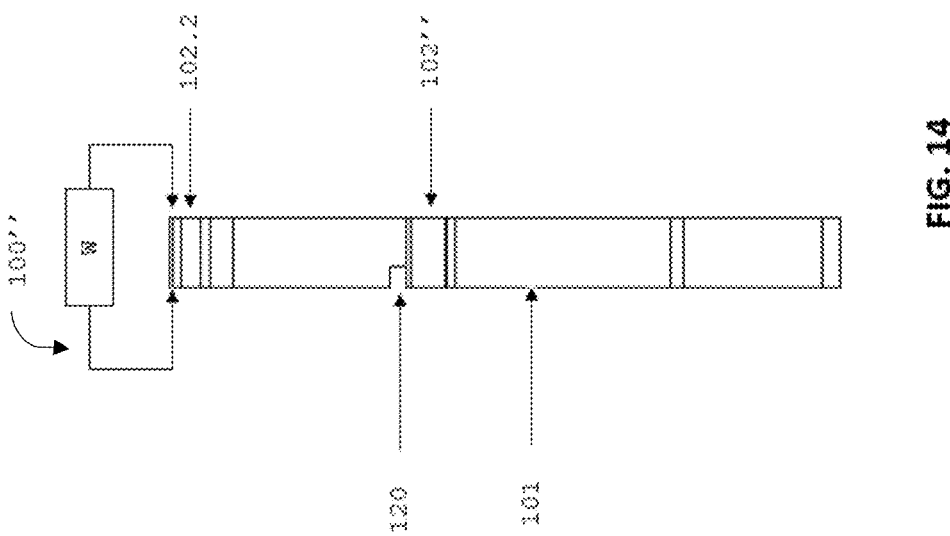
FIG. 14 is an illustration showing a schematic top down view of the fastener according to FIG. 13.

FIG. 14 shows in a top down view that the slit 120 extends all the way through the arm from top to bottom, but not from side to side. In fact the slit is not deeper than half the width W of the arm. Also separately from this example the recess is equal to about 10-40% of the width of the first part 101.1 of the arm 101. This allows the arm to resist breaking off while being handled during the act of fastening, or rather the act of clamping. From both FIGS. 13 and 14 it can be seen that the first and second legs are integral with the arm. Returning to FIG. 13 it can be seen that the distal end 102.1 of the first leg defines a lip extending forward from the arm in the clamping direction C. Clamping direction C is the clamping direction as seen from the first leg. The clamping direction for the second part of the leg is opposite the clamping direction C.

Figure 15:
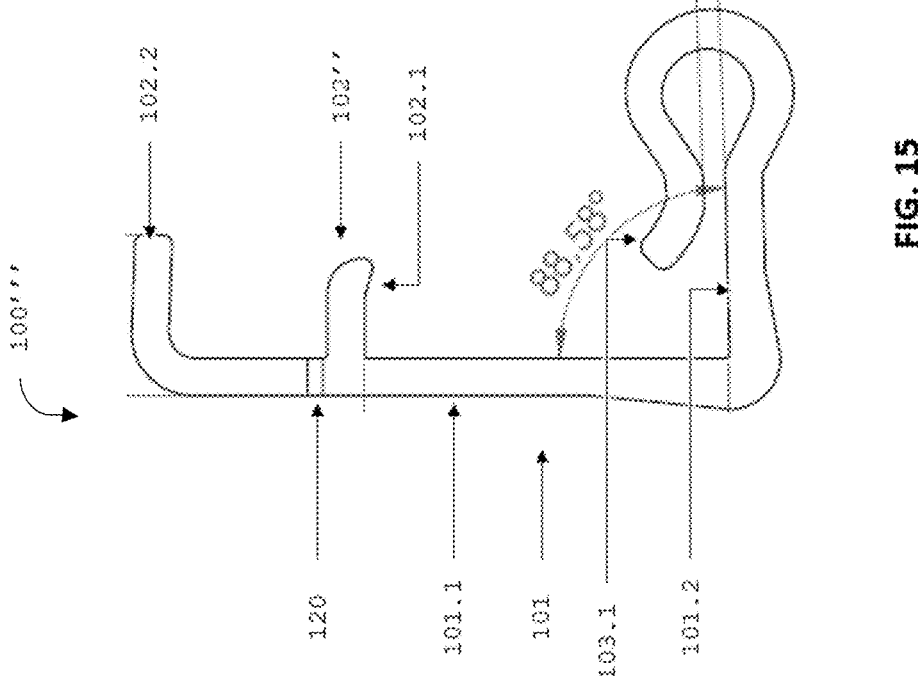
FIG. 15 is an illustration showing a schematic side view of another fastener, wherein the sleeve is replaced with a second leg, according to an embodiment of the present invention.

FIG. 15 shows yet another alternative embodiment of the fastener 100‴ with respect to the fastener 100″ according to FIG. 13. Hereinafter only differences will be discussed. Same features are provided with same reference numbers. In this example the distal end 103.1 of the hook 103 is bent outwards with respect to the curve of the hook so that the distal end and the second part diverge towards the first part 101.1.

Note that in the specification and claims, "about" or "approximately" means within twenty percent (20%) of the numerical amount cited.

Although the invention has been discussed in the foregoing with reference to an exemplary embodiment of the method of the invention, the invention is not restricted to this particular embodiment which can be varied in many ways without departing from the invention. The discussed exemplary embodiment shall therefore not be used to construe the appended claims strictly in accordance therewith. On the contrary the embodiment is merely intended to explain the wording of the appended claims without intent to limit the claims to this exemplary embodiment. The scope of protection of the invention shall therefore be construed in accordance with the appended claims only, wherein a possible ambiguity in the wording of the claims shall be resolved using this exemplary embodiment.

Embodiments of the present invention can include every combination of features that are disclosed herein independently from each other. Although the invention has been described in detail with particular reference to the disclosed embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference. Unless specifically stated as being "essential" above, none of the various components or the interrelationship thereof are essential to the operation of the invention. Rather, desirable results can be achieved by substituting various components and/or reconfiguration of their relationships with one another.

The invention claimed is:

1. A bird guard assembly for installing on a roof for preventing bird nesting underneath a solar panel, the assembly comprising:

a solar panel comprising a frame edge;

a bird guard comprising a rail arranged for abutting at least a part of the frame edge and a bird barrier for extending to the roof; and at least one fastener comprising an arm and an arm sleeve arranged for only cooperating with the arm in a fastening direction for fastening the rail to the frame edge, wherein the arm sleeve comprises a protrusion defining a sleeve clamp surface for engaging the frame edge at a proximal end to a solar collector surface of the solar panel, and wherein the arm comprises a first part arranged for cooperating with the arm sleeve for fastening, and a second part defining an arm clamp surface for engaging the rail.

2. The assembly according to claim 1, wherein the protrusion is kinked so as to form an upside down L-shape, and wherein the sleeve clamp surface is defined on a distal end of the L-shape, and wherein the sleeve clamp surface is undulated, ribbed or stubbled.

3. The assembly according to claim 1, wherein the first part of the arm and the second part of the arm are integral via a kink in the arm, wherein the first part and the second part each increase in thickness towards the kink.

4. The assembly according to claim 3, wherein the frame edge comprises an upstanding wall and a flange, wherein the flange is substantially perpendicular to the upstanding wall, wherein the rail extends over an outer surface of the flange, and wherein the arm comprises a hook arranged for simultaneously curving around the flange and the rail, and wherein a distal end of the hook is bent outwards with respect to the curve of the hook so that the distal end and the second part diverge towards the first part.

5. The assembly according to claim 4, wherein the hook is designed such that a gape of the hook is defined by the distance between an apex of the bend of the distal end and the second part, and wherein the gape is between about 0.5 and 3.0 mm.

6. The assembly according to claim 1, wherein the second part is angled about 70-110 degrees with respect to the first part.

7. The assembly according to claim 1, wherein the frame edge comprises an upstanding wall and a flange, wherein the flange is substantially perpendicular to the upstanding wall, wherein the rail extends over an outer surface of the flange, and wherein the arm comprises a hook arranged for simultaneously curving around the flange and the rail.

8. The assembly according to claim 7, wherein the first part of the arm and the second part of the arm are integral via a kink in the arm, wherein the first part and the second part each increase in thickness towards the kink, and wherein the first part of the arm defines an abutment surface for abutting the upstanding wall.

9. The assembly according to claim 8, wherein the hook is integral with the arm.

10. The assembly according to claim 8, wherein a tip of the hook is curved around the flange and the rail so as to abut an inner surface of the flange.

11. The assembly according to claim 1, wherein:

the arm sleeve comprises a passage way for the passage of the arm therethrough and comprises a moveable protrusion within the passageway, the protrusion is biased from the inner surface of the passage way into the passage way, and the arm comprises a pawl path, wherein a unidirectional engagement of the pawl path with the moveable protrusion of the passage way restricts movement of the arm to one direction within the arm sleeve.

12. The assembly according to claim 1, wherein:

the bird barrier comprises a plurality of spaced rods, and the arm of the at least one fastener is arranged for extending through a space in between subsequent rods of the plurality of spaced rods.

13. The assembly according to claim 1, wherein the first part of the arm of the fastener comprises at least one recess defined as a slit or notch in a lateral side of thereof for breaking the arm there along.

14. A method for preventing bird nesting underneath solar panels, comprising the steps of:

providing a solar panel comprising a frame edge;

providing a bird guard comprising a rail for abutting at least a part of the frame edge and a bird barrier;

providing at least one fastener comprises an arm and an arm sleeve arranged for only cooperating with the arm in a fastening direction;

placing the rail on the frame edge;

fastening the rail to the frame edge between the arm sleeve and a part of the arm by moving the arm sleeve over the arm in the fastening direction; and installing the solar panel on a roof of a building such that a bird barrier of the bird guard extends towards the roof.

15. The method according to claim 14, wherein:

the frame edge comprises an upstanding wall and a flange, and the flange is substantially perpendicular to the upstanding wall, the step of placing the rail on the frame edge comprises extending the rail over an outer surface of the flange, the arm further comprises a hook, and the step of fastening the rail to the frame edge comprises simultaneously hooking the arm around the flange and the rail using the hook before moving the arm sleeve over the arm in the fastening direction.

16. The method according to claim 14, wherein:

the arm sleeve comprises a protrusion defining a sleeve clamp surface, the arm comprises a first part arranged for cooperating with the arm sleeve for fastening, and a second part defining an arm clamp surface, the method step of fastening the rail to the frame edge comprises engaging the frame edge, with the sleeve clamp surface, at a proximal end to a solar collector surface of the panel, and the method step of fastening the rail to the frame edge further comprises engaging the rail with the arm clamp surface.

17. A method for preventing bird nesting underneath solar panels, comprising the steps of:

providing the assembly according to claim 1;

fastening the rail to the frame edge using the at least one fastener; and installing the assembly on a roof of a building such that a bird barrier of the bird guard extends towards the roof.

18. A fastener for fastening a bird guard to a solar panel, the solar panel comprising a frame edge, the bird guard comprising a rail arranged for abutting at least a part of the frame edge and a bird barrier for extending to the roof; and the fastener comprising:

an arm defining a first part and a second part, wherein the first part and second part are substantially perpendicular to each other;

a first leg extending outward from and substantially perpendicular to the first part of the arm, wherein the first leg and the second part are spaced apart so as to allow a portion of the solar panel and a portion of the bird guard to be clamped together therebetween; and an arm sleeve, wherein the arm sleeve comprises a protrusion defining a sleeve clamp surface for engaging the frame edge at a proximal end to a solar collector surface of the panel, and wherein the arm comprises a first part arranged for cooperating with the arm sleeve for fastening, and a second part defining an arm clamp surface for engaging the rail.

19. The fastener according to claim 18, comprising a second leg extending outward from and substantially perpendicular to the first part of the arm, wherein the first and second leg extend upwards from the same face of the first part of the arm and are spaced about 20-40 mm apart.

20. The fastener according to claim 19, wherein the first part of the arm comprises a recess between the first leg and the second leg, within about 0-2 mm from the first leg.

21. The fastener according to claim 20, wherein the recess is furnished as a slit in the lateral side of the first part.

22. The fastener according to claim 19, wherein the first and second legs are integral with the arm.

23. The fastener according to claim 18, wherein the second part of the arm tails off into a hook.

24. The fastener according to claim 23, wherein a distal end of the hook is bent outwards with respect to the curve of the hook so that the distal end and the second part diverge towards the first part.

25. The fastener according to claim 18, wherein a distal end of the first leg defines a lip extending forward from the arm in the clamping direction.

26. A bird guard assembly for installing on a roof for preventing bird nesting underneath a solar panel, the assembly comprising:

a solar panel comprising a frame edge;

a bird guard comprising a rail arranged for abutting at least a part of the frame edge and a bird barrier for extending to the roof; and at least one fastener according to claim 18.

* * * * *